Feb. 20, 1934. H. O. BAUGH 1,948,059
DENTAL DEMONSTRATING DEVICE
Filed Dec. 30, 1931
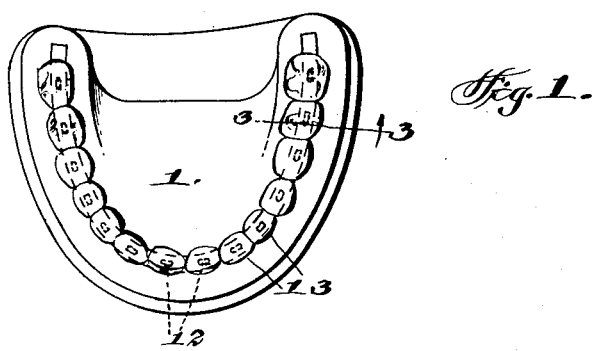
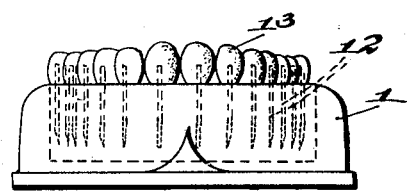
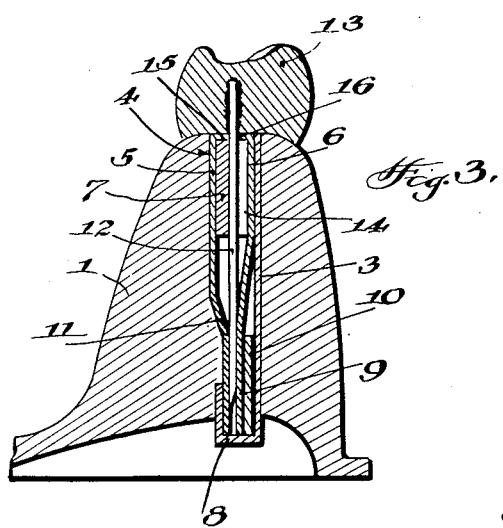
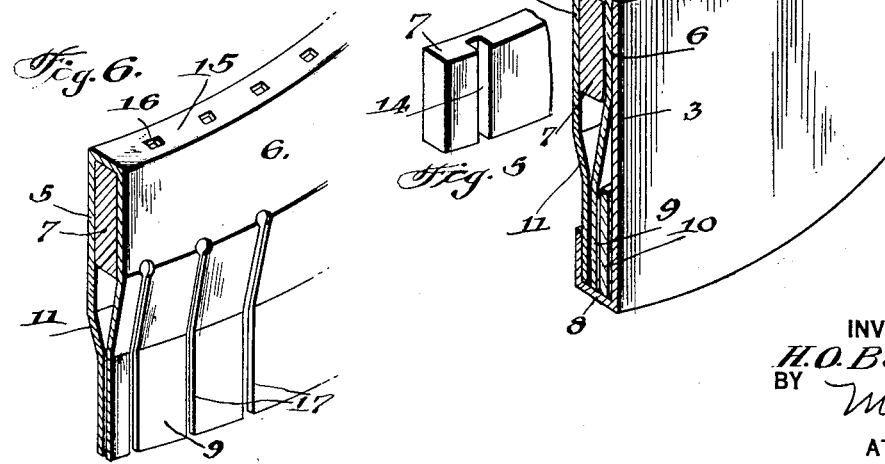
INVENTOR
H. O. Baugh
BY
ATTORNEY Patented Feb. 20, 1934

1,948,059

UNITED STATES PATENT OFFICE 1,948,059

DENTAL DEMONSTRATING DEVICE

Hubert O. Baugh, St. Petersburg, Fla.

Application December 30, 1931
Serial No. 583,949

6 Claims. (Cl. 35—16)

This invention relates to improvements in the art of denistry and its objects are as follows:—

First, to provide a model to be exhibited to the patient for the purpose of demonstrating tooth formations and improvements thereupon, said model being capable of such setting, adjustment or other manipulation as will enable an exact reproduction of the conditions in the patient's mouth and thus to demonstrate any necessary restoration so that he or she can obtain an instant and clear conception of the restorative measures.

Second, to provide a model in which removable teeth are firmly held, when in position, by a spring device which insures keeping the teeth in place but enables the instantaneous displacement of any tooth or combination of teeth so that edentate spaces can be reproduced.

Other objects and advantages will appear in the following specification, reference being had to the accompanying drawing in which Figure 1 is a plan view of one so-called jaw of the model, Figure 2 is a front elevation, Figure 3 is a section taken on the line 3—3 of Figure 1, Figure 4 is a fractional perspective view of the tooth mounting, Figure 5 is a fractional perspective view of the slotted guide plate, Figure 6 is a fractional perspective view of the guide plate and spring assemblage.

As already briefly indicated above, the purpose of the invention is to enable a dentist to demonstrate to a patient how a faulty condition in his or her mouth may be corrected. The idea does not fundamentally consist of providing a toothed plate or jaw for the purpose of demonstration, but more particularly in providing such a plate or jaw with instantly removable or replaceable teeth so that it becomes only the work of a moment or even less to duplicate a given mouth condition and then to show the patient how that condition can be corrected by such restorative measures as the addition of removable bridgework, partial dentures, fixed bridges of any type, crowns and inlays.

At the present time a person having dental work done must rely largely on his imagination as to the effect of the addition of any of the foregoing work. Almost invariably the dentist has occasion to point out certain teeth as requiring treatment of one kind or another. He may indicate such teeth in the patient's mouth by touching them, but it is not so difficult for the patient to mistake one tooth for another so that some uncertainty may arise as to which tooth is in question.

The herein disclosed device is a model of one jaw of the patient's mouth insofar as the tooth arrangement is concerned. The model is intended to be held in the hands of the dentist and the teeth manipulated as previously indicated, so that the patient may know exactly what the dentist means when he states that this or that tooth is affected, and how the tooth formation will look when certain bridgework, or the like has been applied.

Figure 1 illustrates a plate 1, or so-called jaw, which is to be regarded as one of a pair of jaws which in practice will be articulated. The principle of each jaw will be identical, and for that reason the following description is devoted to one jaw.

The substance of the plate 1 may consist of any known investing material, commonly used by dentists, for example Hecolite, which is molded to form, and in being so molded embraces a tooth mounting generally denoted 2 (Fig. 4). This mounting is made of metal and it comprises the following structure:—

A sheathing 3 covers one side and bottom of a spring assemblage which comprises a metal piece 4 that is bent parallel at 5, 6 to partly embrace a guide plate 7. The sheathing 3 is bent to provide a bottom closure 8. This closure co-acts with parts of the piece 4 to complete an incasement for a spring leaf 9 and a spring strip 10.

The portion 5 of the metal piece 4 is bent inwardly at an angle as at 11 to form a back for a sharpened prong 12 of the tooth 13. The part 11 of the back is in line with a slot 14 in the guide plate 7, and the top part 15 of the metal piece 4 has a hole 16 in line with the slot 14. When the prong 12 is inserted as in Figure 3, it bears against the alined hole 16, slot 14 and back 11 so as to have a perfectly secure and true supporting rest.

It is against the bent back 11 in particular that the prong 12 is pressed by the spring leaf 9. The spring leaf is bent inwardly from the parallel part 6 of the metal piece 4, and its pressing function is augmented by the spring strip 10 which has a contracting tendency on the extremity of the spring leaf 9. In addition to this capacity the strip 10 also serves as a guard for the spring leaves 9, preventing some from failing to function as individual springs in case repeated bendings have fatigued the metal almost to the point of breaking. Suppose that the leaf 9 in Figure 3 has been bent so many times that it has lost its springiness. Under that circumstance the prong 12 would not be held with sufficient security. But inasmuch as the spring strip 10 stands back of the particular leaf 9 in Figure 3 as well as back of other leaves, it follows that the springiness of the strip 10 will compel the leaf 9 still to act as a spring so that the holding quality of the prong 12 is not impaired. When the prong 12 is withdrawn there is a tendency to close the prong space adjacent to the back 11. The spring leaf 9 moves over toward the back 11 as shown in Figure 6, and in order that each of the plurality of prongs 12 may be subject to individual spring action the spring leaf 9 is slitted at 17 (Fig. 6) so as to convert the spring leaf into as many independent springs as there are teeth or prongs in the assemblage.

All of the holes 16 and slots 14 are made of rectangular shape to match the cross section of the prongs 12. The cross sectional shape prevents turning of the prongs so that there will be no tendency of the teeth turning in their sockets. The spacing of the holes 16 and their matching slots 14 is governed by the width of the tooth to be positioned; and this variable spacing insures the placing of the teeth in correct position.

As previously indicated, the dentist should be equipped with articulated upper and lower models with a full complement of teeth as indicated in the instance of the jaw or plate 1 (Fig. 1). He should also have at hand for instant demonstration a wide selection of different forms of removable and fixed bridgework, partial dentures, etc. He should also have a sufficient number of extra teeth mounted on metal prongs 12, and these extra teeth should be suitably prepared for receiving the foregoing bridges as well as inlays, crowns, etc. Other extra teeth can be used to show discolored and devitalized teeth, malposition, etc.

Now with this equipment at hand the patient can be shown on the model an exact reproduction of the conditions in his or her mouth, and in seeing the necessary restoration put in place on the model, can get an instant and clear conception of the restorative measures necessary. One of the outstanding advantages resides in the ability to instantly change the teeth 13, that is to say, to either instantly insert them in their proper places or to take them out.

As will be observed in Figure 3 the bottom end of the prong 12 is shown with a bevel on the front side. When the prong 12 is inserted in the hole 16 and slot 14 it will soon come in contact with the angled part of the spring leaf 9 and so displace this part forwardly making room for itself between the spring leaf and the back 11. It has been pointed out that the strip 10 exercises a general contraction on the whole spring leaf, but the independent spring leaves press on the respective prongs 12 insuring a holding of every one so that none will drop out. In this way one tooth will be retained as effectually as if the entire jaw was filled with teeth.

It is of particular note that no part of the tooth mounting is subject to being loose. Everything is contained within the sheathing 3 and metal piece 4. The only requirement for a secure holding of a given prong 12 is to insert it in the tooth mounting.

I claim:—

1. A dental demonstrating device comprising a tooth mounting, a spring leaf, teeth to be mounted on said mounting, and a prong on each tooth, said spring leaf being slitted to provide individual spring means for separately pressing against the individual prongs to hold the teeth in the mounted position.

2. A dental demonstrating device comprising a tooth mounting having holes, teeth to be assembled on the mounting, a prong on each of the teeth to be inserted in the holes for the mounting of the teeth, a spring leaf having slits to provide individual springs for the various prongs, and a spring strip having a collective contracting effect on some of the individual spring leaves.

3. A dental demonstrating device comprising a jaw plate, a tooth mounting incorporated in said plate including a sheathing and a metal piece which has a perforated top part and parallel side portions respectively formed into a back in line with the perforations and a spring leaf, a guide plate situated between said parallel side portions, having slots in registration with the perforations, a spring strip encompassing a portion of the spring leaf, said spring leaf being slitted to convert said leaf into a plurality of spring leaves, teeth to be mounted on said jaw plate, and prongs on the teeth to be inserted in the perforations and guided by the slots to a clamping position between said back and the individual spring leaves, the point of each prong being bevelled to assist in displacing the individual spring leaves.

4. A dental demonstrating device comprising a tooth mounting and teeth to be mounted on said mounting, a prong on each tooth, said mounting having individual spring means for separately pressing against the individual prongs to hold the teeth in the mounted position, and a resilient backing member for some of the individual spring means.

5. A dental demonstrating device comprising a tooth mounting, said mounting including confronting metal pieces bent toward each other to form a constriction, the bent parts of one of the pieces constituting leaf springs, a plurality of teeth, and a prong on each tooth insertable in the mounting and into the construction to be pressed against by the leaf springs.

6. A dental demonstrating device comprising a tooth mounting, said mounting including confronting metal pieces bent toward each other to form a constriction, the bent parts of one of the pieces constituting leaf springs, a plurality of teeth, a prong on each tooth insertable in the mounting and into the constriction to be pressed against by the leaf springs, and a guide plate spacing said confronting metal pieces and having slots in line with the constrictions to receive the prongs.

HUBERT O. BAUGH.